Patented Feb. 14, 1950

2,497,422

UNITED STATES PATENT OFFICE 2,497,422

PRODUCTION OF ALKOXY THIOLS

Harold R. Snyder, Urbana, Ill., and John M. Stewart, Berkeley, Calif., assignors to Phillips Petroleum Company, a corporation of Delaware No Drawing. Application May 9, 1947, Serial No. 747,120

13 Claims. (Cl. 260—609)

This invention relates to methods for the production of alkoxy thiols and to the products formed thereby. More specifically, the present invention relates to a method for the production of alkoxy thiols by the reaction of an alcohol with an olefin sulfide and to the products produced thereby. The process of the present invention is particularly useful for the production of alkoxy thiols from aliphatic alcohols and olefin sulfides.

In accordance with this invention, it has been found that when an olefin sulfide is reacted with an alcohol reaction product is an alkoxy thiol. The reaction products have important uses in the field of manufacture of synthetic rubber. In addition they are useful as intermediates for the preparation of other chemical products.

The employment of thiols as modifiers and promoters in emulsion polymerization processes, as additives to elastomers, intermediates in the production of sulfur-containing organic chemicals, and the like has become significant in the chemical industry. A class of potentially valuable thiols for use in such processes comprises those containing one or more additional functional groups situated near the sulfhydryl group. However, few compounds of this class have been prepared and methods for their production in economical yields are generally unknown.

An object of the present invention is to provide a method for the production of alkoxy thiols.

Another object of the invention is to provide such a process wherein an olefin sulfide is reacted with an alcohol to produce an alkoxy thiol.

Still another object of this invention is to provide new chemical compounds belonging to the class of beta-substituted mercaptans, or alkoxy thiols.

As stated hereinabove, various alcohols may be employed to produce new chemical compounds by reaction with an olefin sulfide in accordance with the present invention. The olefin sulfides, of which ethylene sulfide is the simplest member, contain a sulfur atom attached to two directly-connected carbon atoms, which may be represented structuraly as follows:

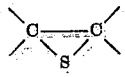

wherein the carbon atoms may be a part of a ring or of an open chain of greater length. As examples of olefin sulfides suitable for use in the process of the present invention, in addition to ethylene sulfide, the following may be mentioned: propylene sulfide, isobutylene sulfide, 1,2-butylene sulfide, higher alkene sulfides; cyclic olefin sulfides, e. g., cyclopentene sulfide, cyclohexene sulfide, and the like; and substituted olefin sulfides, e. g., phenyl propylene sulfide. The reaction of olefin sulfides with alcohols by the process of our invention proceeds as according to the following equation:

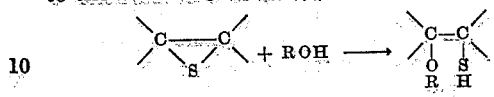

where R is the radical attached to the OH group of the alcohol. Primary, secondary, and tertiary alcohols may be used for carrying out the reaction with an olefin sulfide in accordance with this invention. The alcohols which may be used include unsaturated alcohols, polyhydric alcohols, aromatic alcohols and substituted alcohols, in addition to the more readily available aliphatic alcohols. The primary aliphatic alcohols are most reactive in our process. Certain primary alcohols, including benzyl alcohol, 3-phenylpropanol, and glycol mono-ethers (e. g., ethylene glycol mono-ethyl ether), are less active than the aliphatic primary alcohols and give a lower yield of alkoxy thiol. It is evident that numerous new chemical compounds may be produced by the present process.

In carrying out the reaction, a mixture of the alcohol and olefin sulfide is made up, usually with the alcohol present in an amount in excess of the theoretical. Ordinarily it is desirable to make up the mixture with the alcohol present in an amount approximately twice the amount theoretically required, or in 100 per cent molar excess. Desirably, but not necessarily, the reaction mixture is agitated during at least a part of the reaction period. When polymerizable olefin sulfides, such as ethylene sulfide, are employed a suitable inhibiting agent, such as a mercaptan, should be incorporated in the reaction mixture. The reaction may be carried out at various temperatures and over widely different periods of time. While a temperature within the range of from about 0° C. to about 250° C. may be employed, preferably the reaction temperature is within the range of from about 20° C. to about 160° C. It will be obvious to one skilled in the art that a temperature above the decomposition temperature of the reactants should not be employed. To increase the rate of reaction, it is often desirable to heat the mixture of reactants to a temperature somewhat above normal room temperature (20° C.), but generally not above the boiling point of the mixture. A number of the reaction products of olefin sulfides and alcohols have been prepared by heating the reaction mixture to 100° C. by use of saturated steam at atmospheric pressure. While the reaction is preferably carried out in liquid phase, it may, in some instances, be carried out in vapor phase of desired, the choice being dependent upon the reactants, the catalyst employed, and the like, as will be evident to one skilled in the art of designing apparatus for and carrying out the process. A period of from about 1 hour to about 100 hours is suitable for the reaction, but a reaction time of from about 6 to about 24 hours is generally sufficient and preferably employed. While the pressure may be varied, ordinary atmospheric pressure is conveniently used in carrying out the reaction.

A catalyst is preferably employed to promote the reaction between the olefin sulfide and the alcohol. Suitable catalysts comprise stannic chloride, sulfuric acid, boron fluoride, boron fluoride complex catalysts, e. g., the addition products of boron fluoride with diethyl ether and with acetic acid. The boron fluoride complex catalysts are preferred, particularly the addition product of boron fluoride with acetic acid. Other carboxylic acids may be used for the preparation of a boron fluoride addition product suitable as catalyst for our process. The complex catalyst is prepared by the addition of boron fluoride to the acid. The reaction between the acid and the boron fluoride is exothermic and should be carried out under conditions such that the temperature does not rise above about 100° C. The boron fluoride-acetic acid addition compound which contains two mols of acetic acid per mol of boron fluoride, is conveniently prepared by bubbling the boron fluoride through the acid. Other boron halides, particularly boron chloride and boron bromide, may be used alone or in conjunction with other compounds as catalysts. The addition compound formed by equimolecular amounts of boron fluoride and diethyl ether is also one of the preferred catalysts for the process.

The amount of catalyst employed, when required, is variable and may be within the range of from about .1 to about 10 weight per cent of the alcohol used, however some reaction will take place when greater or lesser amounts of catalyst are used. When mineral acids are used, the acid should be employed in concentrated form; sulfuric acid of at least 95 per cent concentration is preferred.

In carrying out the reaction, the mixture of alcohol and olefin sulfide may or may not be diluted with an inert diluent, such as hexane, cyclohexene, benzene, etc. It is usually preferable to employ an excess of the alcohol used in the reaction as diluent. At the end of the reaction period the reaction mixture, if an acid catalyst has been employed in accordance with this invention, is washed with an aqueous alkaline solution, such as sodium carbonate solution. If the reaction product is very viscous, as when no diluent and insufficient excess alcohol is used, the reaction product may be diluted with a suitable solvent such as diethyl ether. Following the sodium carbonate wash to remove the catalyst the alkoxy thiol may be further washed with water to remove traces of sodium carbonate, contacted with a saturated solution of sodium chloride for removal of water, and dried over anhydrous sodium sulfate or by distillation. The alkoxy thiol product is recovered from the reaction product by distillation. The product may be dried and purified in any other suitable manner by methods known to the art.

In a more specific embodiment the method of the present invention comprises heating a mixture of an olefin sulfide and an alcohol in 100% molar excess to a temperature of about 100° C. in the presence of an acid catalyst. The reactants are maintained at 100° C. for a period of from about 6 to about 24 hours after which product is extracted with ether, washed, dried, and distilled under reduced pressure. The quantity of catalytic material used is about 1% by weight of the alcohol employed. This general procedure was used in carrying out the following specific examples which illustrate particular embodiments of the present invention. The examples are not to be construed as limiting the invention in any way but merely as illustrative of the principles underlying the invention.

*Example I*

To a mixture of 13 grams of n-octanol and 0.13 gram of boron fluoride-acetic acid catalyst, 4.4 grams of isobutylene sulfide was added. The resulting mixture was heated on a steam cone for 20 hours. After cooling to room temperature the product was extracted several times with ether. The combined extracts were washed with sodium carbonate solution, water, and a saturated sodium chloride solution and dried over anhydrous sodium sulfate. Distillation was effected under a pressure of 3.5 mm. to yield the desired addition product which had the following properties:

Boiling point (3.5 mm.) 98–102° C.
Index of refraction at 20° C. 1.4548
Amperometric analysis:
 95.6% total RSH
 95.1% primary RSH
 4.9% tertiary RSH
Yield: 35.8% of theory

*Example II*

The addition product of n-butanol and isobutylene sulfide was prepared by the method of Example I. In this experiment 7.4 grams of n-butanol, 0.074 gram of boron fluoride-acetic acid catalyst and 4.4 grams of isobutylene sulfide were heated to produce the addition product which had the following properties:

Boiling point (4.5 mm.) 59–61° C.
Index of refraction at 20° C. 1.4493
Amperometric analysis:
 95.7% total RSH
 98.1% primary RSH
 1.9% tertiary RSH
Yield: 20.7% of theory

*Example III*

The addition product of 3-phenylpropanol and isobutylene sulfide was prepared by the method of Example I, employing 13.6 grams of gamma-phenyl propanol, 0.14 gram of boron fluoride-acetic acid catalyst and 4.4 grams of isobutylene sulfide. The product had the following properties:

Boiling point (3.5 mm.) 124–130° C.
Amperometric analysis:
 88.4% total RSH
 92.2% primary RSH
 7.8% tertiary RSH
Yield: about 7% of theory

*Example IV*

The addition product of n-heptanol and isobutylene sulfide was prepared using 0.13 gram of concentrated sulfuric acid (95% $H_2SO_4$) as catalyst. 12.8 grams of n-heptanol and 4.4 grams isobutylene sulfide were used. The product obtained at the end of 9.3 hours had the following properties:

Boiling point (3 mm.) 55–56.5° C.
    Index of refraction at 20° C. 1.4533
    Amperometric analysis:
        91.9% total RSH
        94.8% primary RSH
        5.2% tertiary RSH
    Yield: 23.6% of theory

Example V 4.4 grams of isobutylene sulfide and 13 grams of 2-ethylhexanol was reacted for a period of 15½ hours on a steam bath under reflux conditions. 0.13 gram of boron fluoride etherate (the addition product of boron fluoride and diethyl ether) was used as the catalyst. The product had the following properties:

Boiling point (2.5 mm.) 92–93° C.
    Index of refraction at 20° C. 1.4555
    Amperometric analysis:
        88.83% total RSH
        83.8% primary RSH
        16.2% tertiary RSH
    Yield: 31% of theory Micro analyses of the various products prepared in accordance with the present invention, as exemplified by the foregoing examples, show that the olefin sulfide undergoes an addition reaction with the alcohol. It is believed that the reaction product is a mercaptan or alkoxy thiol as represented in the structural formula given hereinabove. This product is formed by the addition of one mol of alcohol to one mol of olefin sulfide, regardless of the exact mechanism of the addition.

It will be understood that it is not the intent to limit the invention by the limitations imposed by the theories set forth hereinabove but that the invention is directed to the reaction between olefin sulfides and alcohols and to the products formed thereby regardless of the mechanism of the reaction.

We claim:

1. The method of producing an alkoxy thiol which comprises reacting a molecular equivalent of an alcohol containing from 2 to 9 carbon atoms per molecule with one molecular equivalent of an olefin sulfide containing from 2 to 9 carbon atoms per molecule in the presence of a minor proportion of the addition product of boron fluoride and acetic acid as catalyst and recovering from the reaction mixture a resulting alkoxythiol reaction product.

2. The method of producing an alkoxy thiol which comprises reacting a molecular equivalent of an alcohol containing from 2 to 9 carbon atoms per molecule with one molecular equivalent of an olefin sulfide containing from 2 to 9 carbon atoms per molecule in the presence of a minor proportion of the addition product of boron fluoride and diethyl ether as catalyst, and recovering from the reaction mixture a resulting alkoxythiol reaction product.

3. The method of producing an alkoxy thiol which comprises reacting a molecular equivalent of an alcohol containing from 2 to 9 carbon atoms per molecule with one molecular equivalent of an olefin sulfide containing from 2 to 9 carbon atoms per molecule in the presence of a minor proportion of sulfuric acid as catalyst, and recovering from the reaction mixture a resulting alkoxythiol reaction product.

4. The method of producing an alkoxy thiol which comprises reacting a glycol mono-ether containing not more than 9 carbon atoms in the molecule with an olefin sulfide containing from 2 to 9 carbon atoms per molecule in the presence of the additional product of boron fluoride and acetic acid as catalyst.

5. A method of producing an alkoxy thiol which comprises reacting a molecular equivalent of an alcohol containing from 2 to 9 carbon atoms per molecule with one molecular equivalent of an olefin sulfide containing from 2 to 9 carbon atoms per molecule in the presence of an acid catalyst, and recovering from the reaction mixture a resulting alkoxy thiol reaction product.

6. A method of producing an alkoxy thiol which comprises reacting a molecular equivalent of an alcohol containing from 2 to 9 carbon atoms per molecule with one molecular equivalent of an olefin sulfide containing from 2 to 9 carbon atoms per molecule and recovering from the reaction mixture a resulting alkoxy thiol reaction product.

7. A method of producing an alkoxy thiol which comprises reacting in liquid phase a molecular equivalent of n-octanol with a molecular equivalent of isobutylene sulfide in the presence of a minor proportion of a catalyst comprising the addition product of boron fluoride and acetic acid at a reaction temperature between 20 and 160° C., and recovering from the reaction mixture a resulting n-octoxy thiol as a product of the process.

8. The method of producing an alkoxy thiol which comprises reacting an alcohol containing from 2 to 9 carbon atoms per molecule with an olefin containing from 2 to 9 carbon atoms per molecule in a molecular ratio thereto of 1:1.

9. The method of producing an alkoxy thiol which comprises reacting a glycol mono-ether containing not more than nine carbon atoms in the molecule with an olefin sulfide containing from 2 to 9 carbon atoms in the molecule, and recovering from the reaction mixture a resulting alkoxy thiol reaction product.

10. A chemical compound containing the structure

and which corresponds to the reaction product of one molecular equivalent of an olefin sulfide containing from 2 to 9 carbon atoms per molecule with a molecular equivalent of a glycol monoether containing not more than 9 carbon atoms per molecule, wherein R is the radical attached to the OH group of said glycol mono-ether, and each dangling valence is attached to a radical selected from the group consisting of hydrocarbon and hydrogen.

11. The chemical compound in accordance with claim 10 wherein R is the radical attached to the OH radical in a corresponding ethylene glycol monoether.

12. The chemical compound in accordance with claim 10 wherein R is the radical attached to the OH radical of ethylene glycol monoethylether.

13. The chemical compound of claim 10 wherein said sulfide is isobutylene sulfide.

HAROLD R. SNYDER.
            JOHN M. STEWART.

(References on following page)

REFERENCES CITED

The following references are of record in the file of this patent:

UNITED STATES PATENTS

| Number | Name | Date |
|---|---|---|
| 2,397,689 | Pavlic et al. | Apr. 2, 1946 |
| 2,402,878 | Doumani | June 25, 1946 |

FOREIGN PATENTS

| Number | Country | Date |
|---|---|---|
| 351,034 | Italy | Aug. 2, 1937 |
| 558,790 | Great Britain | Jan. 21, 1944 |
| 696,774 | Germany | Sept. 28, 1940 |

OTHER REFERENCES

Swallen et al., J. A. C. S., vol. 52, pages 651–660 (1930).